US008966776B2

(12) United States Patent
Kelly (10) Patent No.: US 8,966,776 B2
(45) Date of Patent: Mar. 3, 2015

(54) LASER SQUARE

(75) Inventor: James H. Kelly, Cleveland, TX (US)

(73) Assignee: KellyCraft Innovations, LLC, Cleveland, TX (US)

( * ) Notice: Subject to any disclaimer, the term of this patent is extended or adjusted under 35 U.S.C. 154(b) by 21 days.

(21) Appl. No.: 13/363,500

(22) Filed: Feb. 1, 2012

(65) Prior Publication Data

US 2012/0317824 A1 Dec. 20, 2012

Related U.S. Application Data

(60) Provisional application No. 61/446,713, filed on Feb. 25, 2011.

(51) Int. Cl.
*G01C 15/12* (2006.01)
*B43L 13/00* (2006.01)
*G01B 3/56* (2006.01)

(52) U.S. Cl.
CPC ............... *G01C 15/12* (2013.01); *G01B 3/566* (2013.01); *Y10S 33/21* (2013.01)
USPC ........................ 33/286; 33/DIG. 21

(58) Field of Classification Search
CPC .. G01C 15/004; G01C 15/002; G01C 15/105; G01C 15/008; G01B 11/27
USPC ..................... 33/286, 228, DIG. 21
See application file for complete search history.

(56) References Cited

U.S. PATENT DOCUMENTS

| | | |
|---|---|---|
| 6,230,416 B1 | 5/2001 | Trigilio |
| 6,763,595 B1 | 7/2004 | Hersey |
| 6,839,974 B1 | 1/2005 | Hitchcock |
| 7,219,437 B2 | 5/2007 | Dallman |
| 7,430,810 B2 | 10/2008 | Sergyeyenko et al. |
| 7,454,840 B2 * | 11/2008 | Delfini et al. .................. 33/286 |
| 7,469,480 B2 * | 12/2008 | Nottingham et al. .......... 33/286 |
| 2001/0049879 A1 | 12/2001 | Moore, Jr. |
| 2006/0037205 A1 * | 2/2006 | Sergyeyenko et al. ........ 33/426 |
| 2006/0168828 A1 * | 8/2006 | Dallman ........................ 33/286 |
| 2006/0168830 A1 * | 8/2006 | Dallman ........................ 33/286 |
| 2006/0277774 A1 | 12/2006 | Nottingham |
| 2007/0079516 A1 * | 4/2007 | Eckstein et al. ............... 33/286 |
| 2007/0144019 A1 * | 6/2007 | Delfini et al. .................. 33/286 |
| 2007/0271801 A1 * | 11/2007 | Campagna et al. ............ 33/286 |
| 2012/0317824 A1 * | 12/2012 | Kelly ............................. 33/286 |
| 2013/0145635 A1 * | 6/2013 | Dallman ........................ 33/286 |

FOREIGN PATENT DOCUMENTS

| GB | 2418740 A | 4/2006 |
|---|---|---|
| GB | 2418740 B | 4/2006 |

OTHER PUBLICATIONS

Search Report and Written Opinion for related PCT application No. PCT/US12/000341 dated Sep. 20, 2012.

* cited by examiner

*Primary Examiner* — Yaritza Guadalupe-McCall
(74) *Attorney, Agent, or Firm* — D'Ambrosio & Menon, PLLC; Usha Menon (57) ABSTRACT

A square includes a laser indicator and comprises a two-part body with a channel running between them defining a pair of perpendicular arms. The channel holds a cavity for a battery or other portable power source as part of an electrical circuit. One or both arms may include a scale as well as an elongate opening on the top of the arm for a handle to move a laser/indicator back and forth along the opening. The arms preferably include a pair of bus bars to conduct electricity from the power source to the laser. The second arm may also include a laser light source that is capable of moving in a direction parallel to the arm, as well as rotating in place.

11 Claims, 6 Drawing Sheets

LASER SQUARE

This application claims the benefit of U.S. Provisional Patent Application No. 61/446,713 filed Feb. 25, 2011.

FIELD OF THE INVENTION

The present invention relates generally to the field of laser squares and, more particularly, to a simple and robust laser square using a laser alignment feature. The invention further relates to a laser square using a first laser alignment element having transverse alignment while maintaining angular alignment and a second laser alignment element having both transverse and angular alignment.

BACKGROUND OF THE INVENTION

In U.S. Pat. No. 7,430,810; Sergyeyenko et al. illustrated a laser, square, protractor kit which has a laser marker with a housing. The housing has a first positioning member. The protractor has a base with a second positioning member which cooperates with the first positioning member to position the housing on the protractor base. The protractor base also includes a third positioning member. A framing square is coupled with the third positioning member enabling the protractor to be positioned on the framing square.

In U.S. Pat. No. 6,839,974; Hitchcock described a multi-function layout square of modular construction having a laser that is capable of performing multiple functions. The multi-function square has a metallic outer casing with magnetic properties, with a protractor plate slidably, pivotally, and removably attached by thumbscrews to the casing that can be moved and rotated with respect to the casing and slid linearly along a portion of the length of the casing. When the protractor plate is removed the casing may be used as a level, a plumb bob, a ruler, and a compass. When the protractor plate is attached the tool may be used as a framing square, roofing framing square or rafter square, and a gauge or scribe for straight lines, arcs, or circles. The laser, a switch, and a pair of bubble level vials are contained in a module installed at one end of the casing, and a second module containing batteries is removably installed at the other end of the casing. Each module has electrical contacts that engage the interior surface of the casing and contacts that engage the batteries when the modules are installed and abutted. When the switch is on, a circuit is completed through the metallic casing, which electrically connects the batteries to the laser. The casing may be suspended vertically from a support surface by passing a string or wire through a bore in one of the thumbscrews, may be mounted on a tripod, or may be magnetically attached to metal objects.

In U.S. Pat. No. 6,763,595; Hersey described an apparatus for projecting an indication of alignment. The device forms a first output beam, and a second output beam that is substantially perpendicular to the first output beam. The first output beam indicates level, the second output beam indicates plumb, and the first and second output beams together indicate square. An error indicator indicates an error in the accuracy of the first and second output beams as indicators of level and plumb respectively. The error indicator can be deactivated, such that the first and second output beams together can be used at least to indicate square.

In U.S. Pat. No. 6,230,416; Trigilio showed a square holding a laser device for transmitting a laser beam to generate straight lines from the square to the surface upon which the laser beam impinges.

In U.S. Publication No. 2001/0049879; Moore, Jr. described a portable level and square laser alignment tool comprising a base and a separable L-shaped square. The base serves as an adjustable mounting surface upon which the L-shaped square is removably secured via a dual cam mechanism. The L-shaped square comprises two legs positioned at ninety degrees from each other thereby serving as a square to draw and/or test inside or outside right angles. Carried on each leg is a bubble level for providing a means to level the L-shaped square and/or the base. Additionally, a battery powered laser is attached to and is positioned in-line with each leg. The L-shaped square can be utilized alone or in conjunction with the base.

At least one feature that these and other laser squares known in the art have in common is that they are far too complex for the average hobbyist or home repair/remodeler. Thus, there remains a need for a simple, yet robust, square to assist the user is aligning a desired object at a right angle. The device should be dedicated to this one task, thereby be affordable to even those with limited means. The present invention is directed to solving this long felt need in the art.

SUMMARY OF THE INVENTION

The present invention is a square with a laser indicator, which is particularly useful for a hobbyist to help her align photographs etc. to be mounted on pages. It has other uses, such as assisting a worker laying tiles to mark a line on a tile for cutting when the walls and corners are not precisely plumb.

The laser square comprises a two-part body, top and bottom, with a channel running between them. The channel holds a cavity for a battery, either AA, AAA, disc battery, or other portable power source. Wires run through the channel to a parallel set of bus bar to power the laser. The wires also include a switch to turn on and turn off the laser.

One arm of the body includes a scale. The arm with the scale includes an elongate opening on the top of the arm for a handle to move the laser/indicator back and forth along the opening. The arm with the scale also includes an elongate opening on the inside surface for the laser to shine through.

The arm with the scale also include a pair of parallel bus bars to conduct electricity from the power source to the laser. As the laser is moved along its elongate opening, contacts on the laser stay in abutting, sliding contact with the bus bars.

These and other features of the present invention will be apparent to those of skill in the art from a review of the following detailed description when read in light of the accompanying drawing figures.

BRIEF DESCRIPTION OF THE DRAWING FIGURES

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENTS

Figure 1:
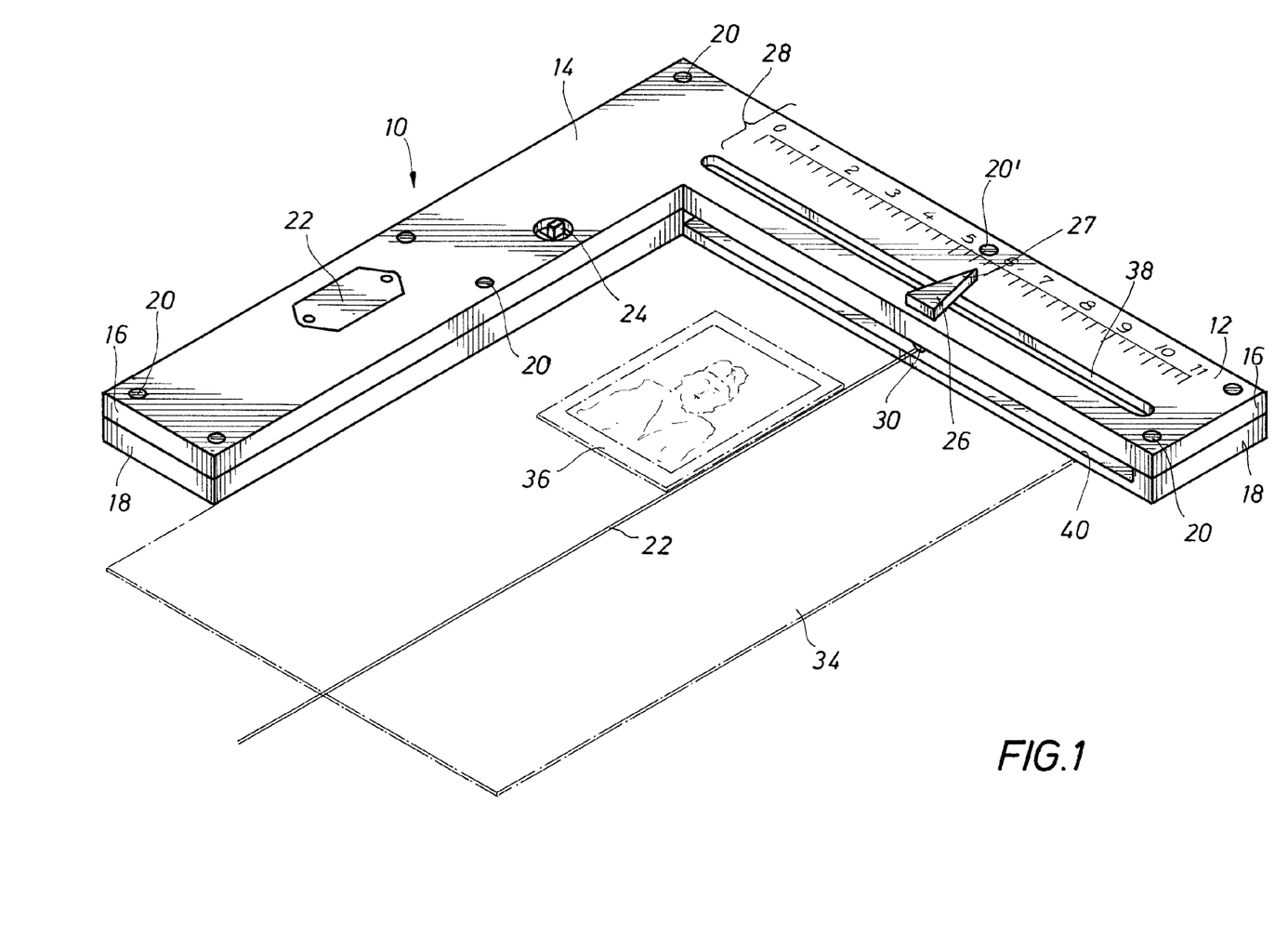
FIG. 1 is a perspective view of a presently preferred embodiment of the laser square of this invention.
Figures 2, 3:
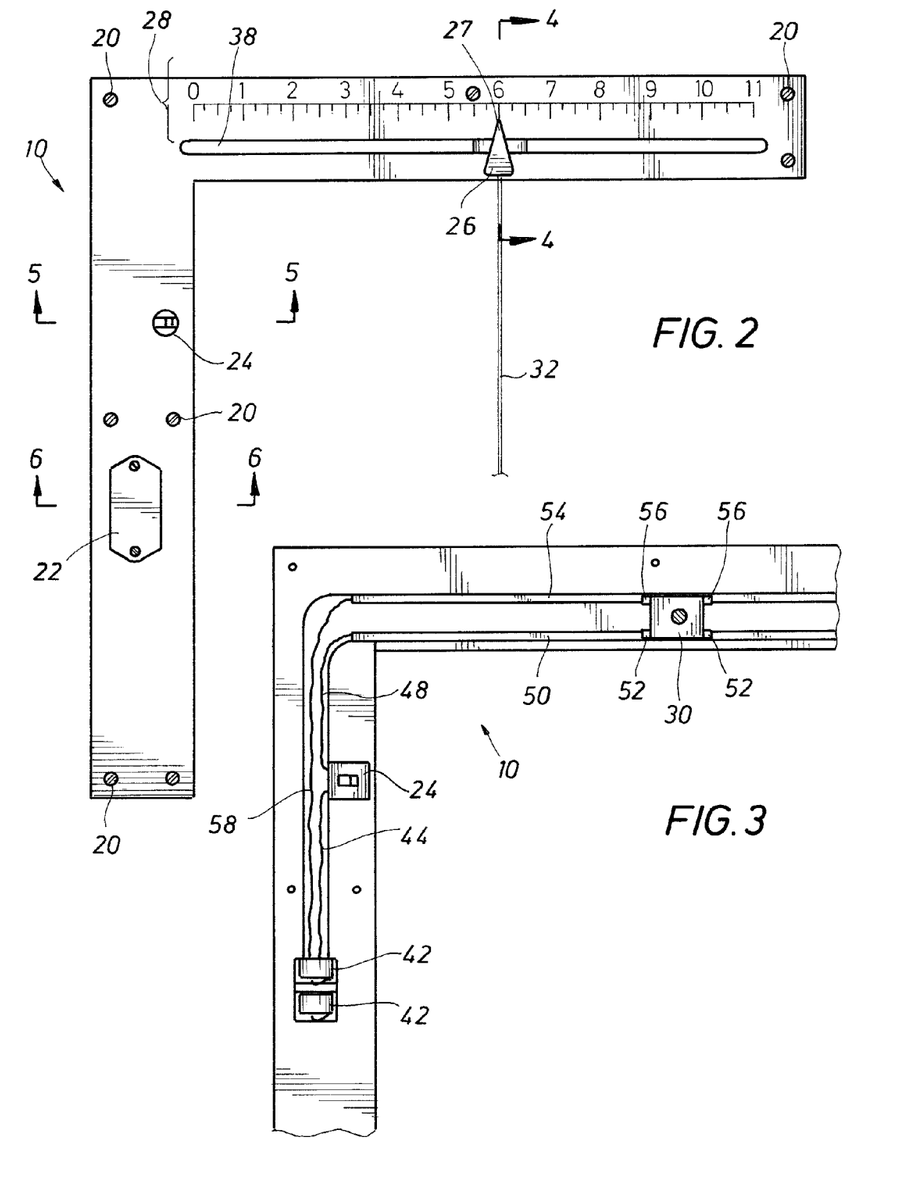
FIG. 2 is top view of the top half of the laser square of FIG. 1.
FIG. 3 is a top view of a bottom half of the laser square.

FIGS. 1, 2, and 3 illustrate a presently preferred embodiment of a laser square 10 constructed in accordance with the teachings of this invention. The laser square 10 includes a first arm, referred to herein as a scale arm 12, and a second arm, referred to herein as an alignment arm 14. The scale arm 12 and the alignment arm 14 are each preferably formed of a top half 16 and a bottom half 18. The top half 16 includes its portion of the scale arm 12 and alignment arm 14, formed together as a single article of manufacture. Similarly, the bottom half 18 includes its portion of the scale arm 12 and alignment arm 14, formed together as a single article of manufacture. The top half 16 and the bottom half 18 are joined together, such as with screws 20 or other appropriate means as desired, such as for example by gluing the top half and bottom half together. An adjustment screw 20' operates to adjust the length of a light beam 32, described in more detail below.

The laser square 10 further includes a battery compartment 22, an on/off switch 24, and a position indicator 26 with a pointed end 27, all of which are described below in greater detail. The position indicator 26 moves back and forth along a scale 28, positioned along the scale arm 12. The position indicator and scale are intended to show the user the relative positions of items being aligned. The scale may be replaceable so that the user can select which scale to use. A laser light source 30 is coupled to the position indicator 26 so that, as the position indicator 26 is moved back and forth, the laser light source 30 is moved along with it. The laser light source 30 generates the light beam 32, shown in FIG. 1 as illuminating a line along a flat surface 34. The light 32 is particularly helpful to align, for example, a photograph 36, or other matter along a surface 34. The adjustment screw 20' may also be provided to adjust the length of the light beam 32, preferably by adjusting the positioning of the laser light source 30.

As previously stated, the position indicator 26 is mechanically coupled to the laser light source 30. The pointed end 27 of the position indicator 26 is positioned adjacent the scale 28 for ease of determining the position of the light beam 32 upon the surface 34. The mechanical coupling between the indicator 26 and the source 30 is shown and described below in respect of FIG. 4. The coupling extends through an elongate opening 38 formed in the top half 16 of the scale arm 12. The elongate opening 38 is long enough to allow the indicator to reach the full extent of the scale 28.

As previously described, the source 30 generates a light beam 32. The light beam from the laser light source extends through a window 40, which is preferably positioned in the bottom half 18 of the scale arm 12, although it may be formed between the top half 16 and the bottom half 18, so long as the beam is not obstructed as it leaves the source 30 to illuminate a line on the surface 34.

FIG. 3 depicts a presently preferred electrical arrangement for powering the laser light source 30. Direct current electrical power is preferably provided by one or more batteries 42, although wall current may be used, if desired, from an AC outlet with an AC to DC converter to provide appropriate power to the source 30. A conductor 44 carries electrical current to the switch 24. With the switch 24 in a closed position, a conductor 48 carries the current to a first bus bar 50. A first set of contacts 52 ride along the first bus bar 50 to define an electrical input to the source 30. A second bus bar 54 runs parallel physically but in series electrically with the first bus bar 50. A set of contacts 56 ride along the second bus bar 54 to define an electrical output from the source 30. Electrical current is then conducted from the second bus bar 54 by a conductor 58 back to the batteries to complete the circuit.

It will be understood by those of skill in the art that many other arrangements may be devised to provide electrical power as selected by a user to a laser light source, other than that illustrated herein, fully within the scope and spirit of this invention.

Figure 4:
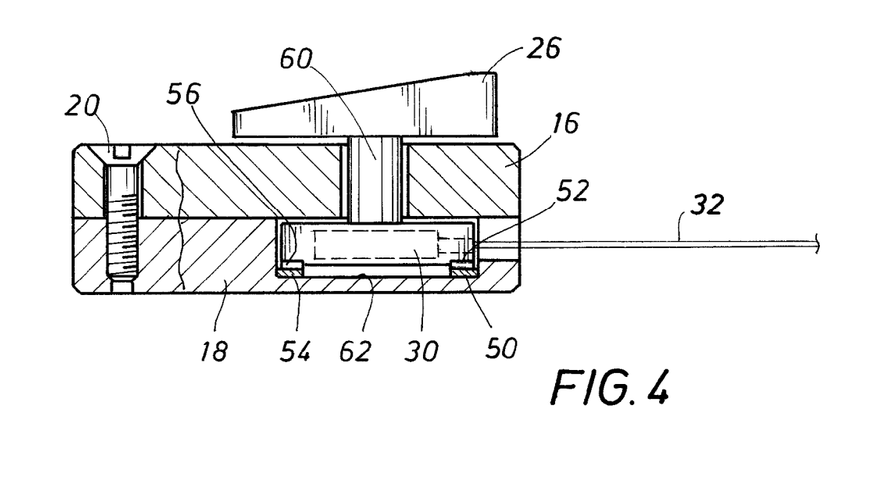
FIG. 4 is a side section view of the scale arm of the square taken along section lines 4-4 of FIG. 2.

FIG. 4 provides a side section view of the position indicator 26, as taken along section lines 4-4 of FIG. 2. The position indicator 26 is coupled to the laser light source 30 with a shaft 60 or other appropriate coupling means. Thus, as the indicator 26 is moved along the scale 28, the laser light source 30 is moved along with it so that the light beam 32 is always projected aligned with but 180° from the pointed end 27 of the indicator. The laser light source 30 preferably rests within an indicator channel 62 formed in the bottom half 18 and which is long enough to accommodate the full travel of the indicator 26.

Thus, as the indicator 26 moves within the scale arm 12, the first set of contacts 52 ride along the first bus bar 50 and the second set of contacts 56 ride along the second bus bar 54, thereby providing electrical power to the laser light source 30, generating the light beam 32.

Figure 5:
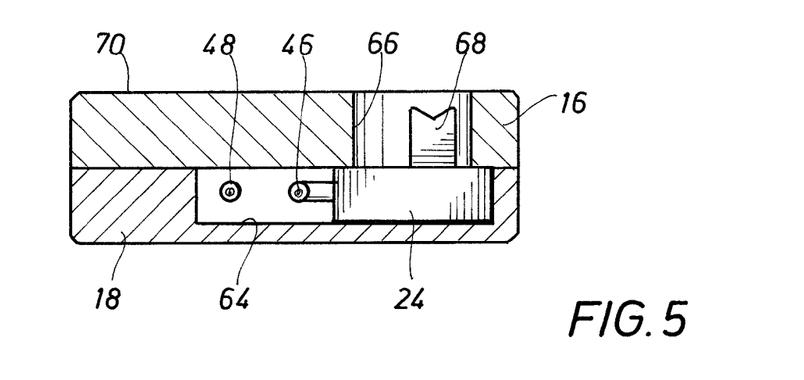
FIG. 5 is a side section view of the alignment arm of the square taken along section lines 5-5 of FIG. 2.

FIG. 5 depicts a side section view of the alignment arm 14, taken along the section lines 5-5 of FIG. 2, through the switch 24. The switch 24 is fixed in place in a dedicated switch well 64 formed in the bottom half 18. An access hole 66 is formed in the top half 16 to allow access to a switch operator 68 extending vertically from the switch 24. Preferably, the top of the operator 68 is below a top surface 70 of the square 10, to prevent inadvertent operation of the switch.

Figure 6:
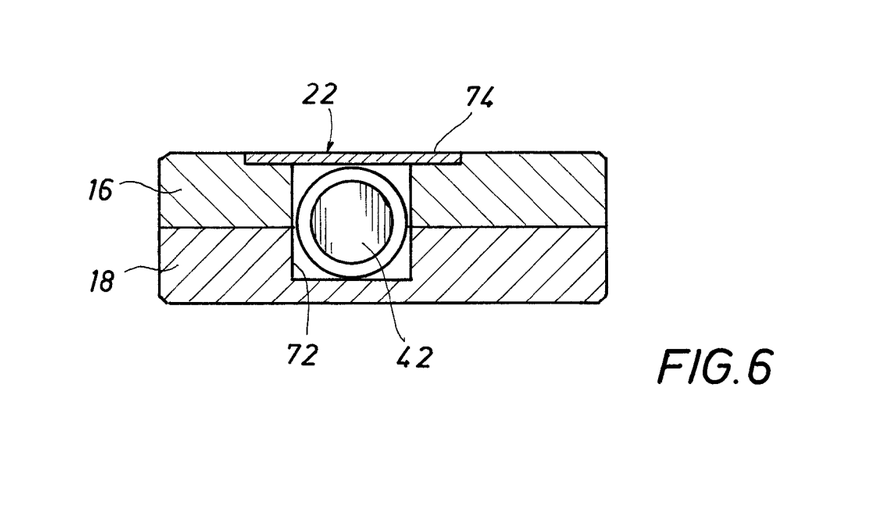
FIG. 6 is a side section view of the alignment arm of the square taken along section lines 6-6 of FIG. 2.

Next, FIG. 6 shows a side section view of the alignment arm through the battery compartment 22. The battery compartment comprises a battery well 72 formed in both the bottom half and the top half and further includes a cover 74 for ease of changing out the batteries 42, as desired.

Figure 7:
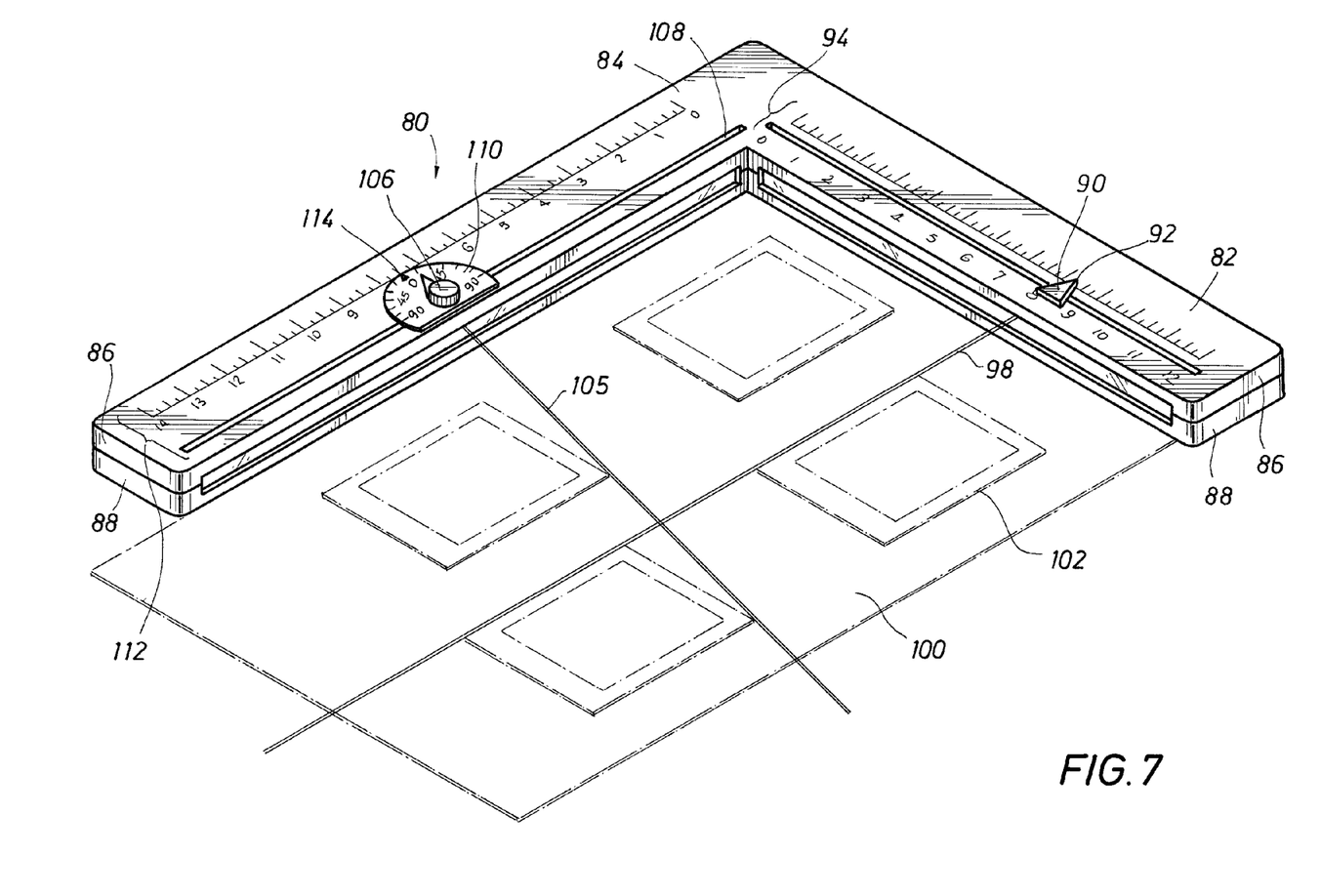
FIG. 7 is a perspective view of another presently preferred embodiment of the laser square of this invention.

FIGS. 7 through 11, inclusive, show another presently preferred embodiment of the laser square of this invention. As shown in FIG. 7, a laser square 80 comprises a first scale arm 82 and a second scale arm 84. The first scale arm 82 and the second scale arm 84 are each preferably formed of a top half 86 and a bottom half 88. The top half 86 includes its portion of the first scale arm 82 and the second scale arm 84, formed together as a single article of manufacture. Similarly, the bottom half 88 includes its portion of the first scale arm 82 and second scale arm 84, formed together as a single article of manufacture. The top half 86 and the bottom half 88 are joined together as previously described in respect of the description of the laser square depicted in FIG. 1.

In the embodiment of FIG. 7, the first scale arm 82 closely resembles the scale arm 12, shown in FIG. 1 and described above. The first scale arm 82 includes a position indicator 90 with a pointed end 92. The position indicator 90 moves back and forth along a scale 94, positioned along the first scale arm 82. A laser light source 96 (See FIGS. 9 and 10) is coupled to the position indicator 90 so that, as the position indicator 90 is moved back and forth, the laser light source 96 is moved along with it, always pointed in the same direction as illustrated by a laser light beam 98. The laser light source 96 generates the light beam 98, shown in FIG. 7 as illuminating a line along a flat surface 100. The light 98 is particularly helpful to align, for example, a photograph 102.

In the preferred embodiment of FIG. 7, the laser square includes a rotatable laser light source 104 (See FIG. 11) to generate a rotatable light beam 105. The laser light source 104 is coupled to a rotatable position indicator 106 which is also capable of translating along an elongate opening 108. The rotatable position indicator 106 is mounted above a scale plate 110 which is marked off in units of angle, for example in degrees, with 0° shown adjacent a linear scale 112. The 0° position is also marked with a caret 114 to clearly indicate the linear position of the laser light source 104 along the linear scale 112. The rotatable light beam is particularly useful to align elements such as photographs at an angle other than perpendicular as with the beam 98.

Figures 8, 9:
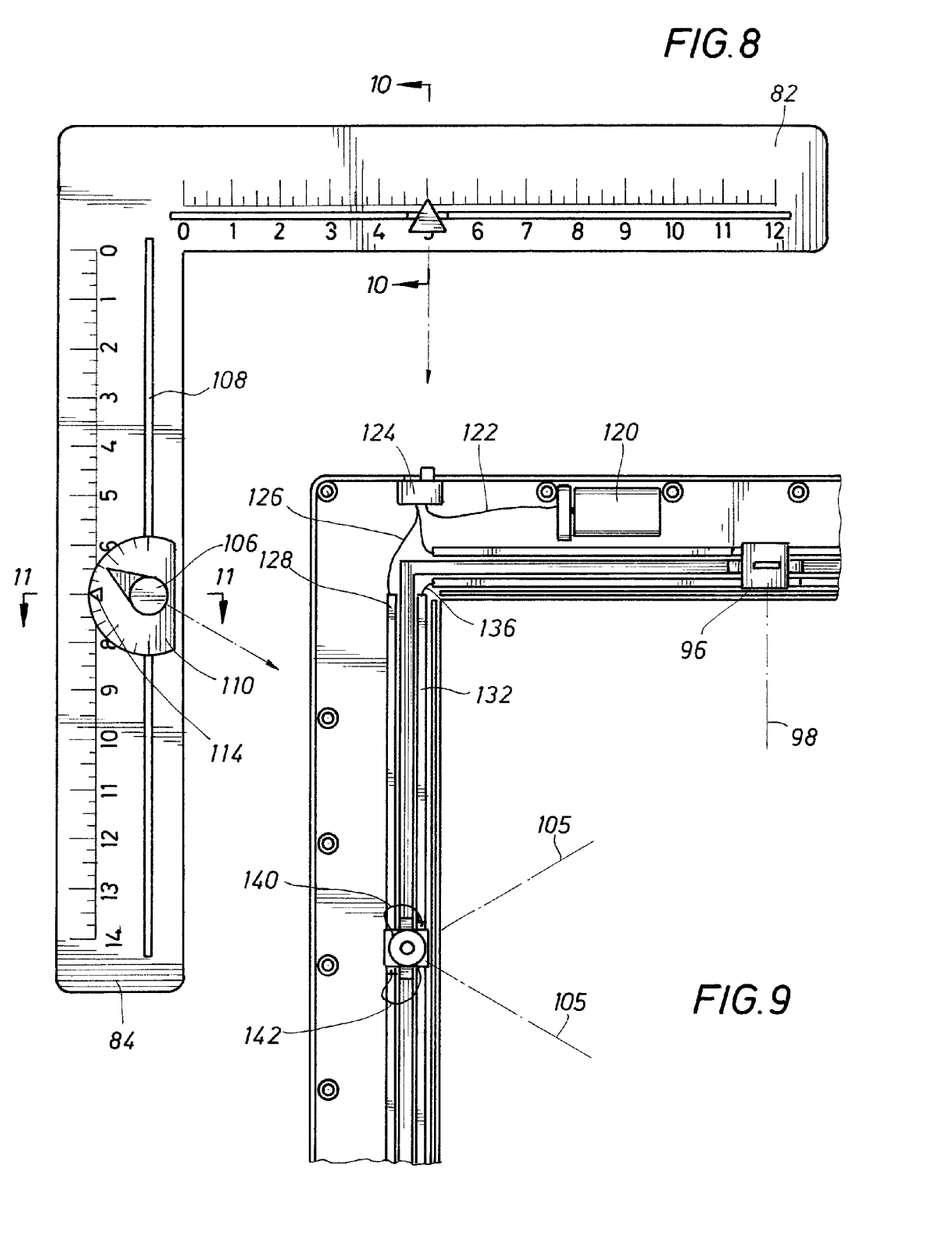
FIG. 8 is top view of the top half of the laser square of FIG. 7.
FIG. 9 is a top view of a bottom half of the laser square of FIG. 7.

FIG. 9 depicts a presently preferred electrical arrangement for powering the laser light sources 96 and 104. Direct current electrical power is preferably provided by one or more batteries 120, although wall current may be used, if desired, from an AC outlet with an AC to DC converter to provide appropriate power to the sources 96 and 104. A conductor 122 carries electrical current to a switch 124. With the switch 124 in a closed position, a conductor 126 carries the current to a first bus bar 128. A first set of contacts 130 ride along the first bus bar 128 to define an electrical input to the source 104. A second bus bar 132 runs parallel physically but in series electrically with the first bus bar 128. A set of contacts 134 ride along the second bus bar 132 to define an electrical output from the source 104. Electrical current is then conducted from the second bus bar 132 by a conductor 136 to the previously described bus bar 50 to the source 96. The source 96 functions in a manner described in respect of the source 30 of FIG. 1.

The source 104 is also provided with a conductor 140 and a conductor 142 to provide slack in the wire to accommodate the rotation of the source 104. Note also that the source 104 is provided with a window 144 similar in structure and orientation to that of window 40 (See FIGS. 1 and 10.

Figure 10:
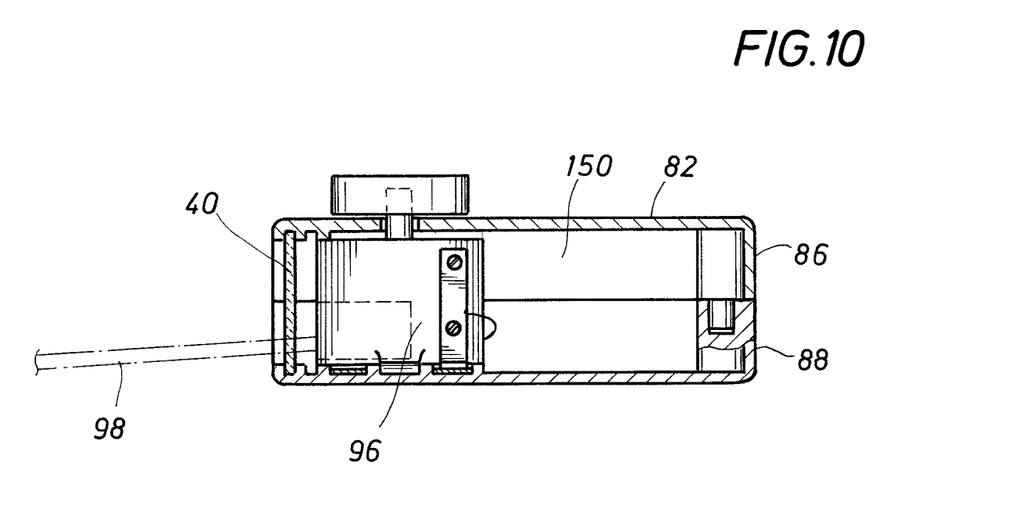
FIG. 10 is a side section view of one alignment arm taken along section lines 10-10 of FIG. 7.
Figure 11:
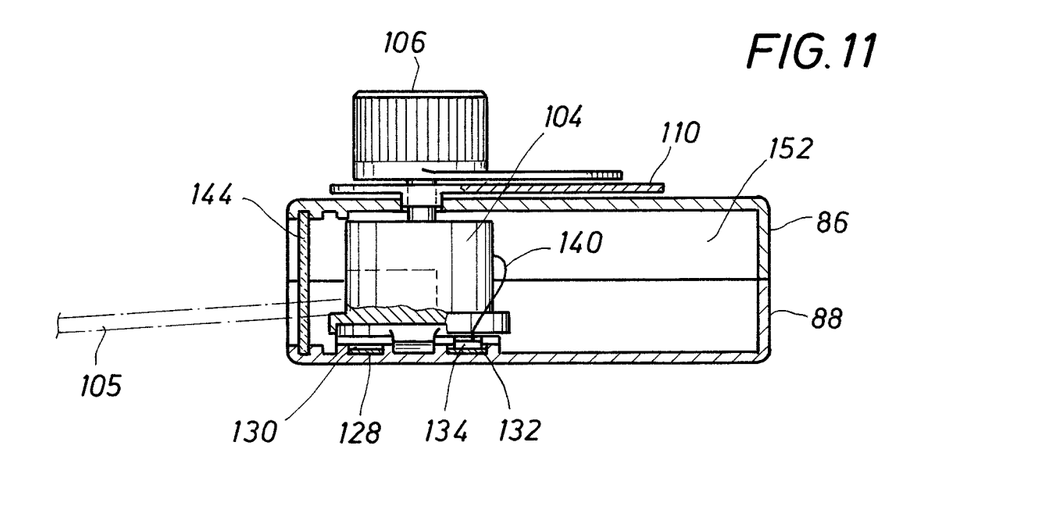
FIG. 11 is a side section view of a second alignment arm taken along section lines 11-11 of FIG. 7.

Note in FIG. 10 that the first scale arm 82 defines a different cross section than that shown in FIG. 4. The first scale arm may define an elongate channel 150 formed between the top half 86 and the bottom half 88. Similarly, as shown in FIG. 11, the second scale arm may define an elongate channel 152 between the top half 86 and the bottom half 88. The arrangement illustrated in FIGS. 10 and 11 provides additional cross-section area to accommodate larger and more robust components.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A laser square comprising:
    a scale arm defining a scale, wherein the scale arm comprises a position indicator, and wherein the position indicator comprises a pointed end;
    an alignment arm at a right angle to the scale arm;
    a source of laser light, wherein the source of light is arranged to translate along the scale arm in an infinitely variable manner and in a smoothly continuous manner to any position within a limit of travel along the scale arm, the source of laser light emitting a laser light beam perpendicular to the scale arm;
    a screw located on the scale arm for adjusting a length of the laser light beam;
    an elongate channel formed in a bottom portion of the scale arm, wherein the source of laser light is located in the channel;
    a shaft for mechanically coupling the source of laser light to the position indicator, wherein the shaft extends through an elongate opening formed in a top half of the scale arm;
    a conductor comprising:
        a first bus bar, and
        a second bus bar running parallel to the first bus bar, wherein the first and the second bus bars along with the source of laser light facilitate the alignment of the laser light beam at 180 degrees from the pointed end of the position indicator;
    at least two sets of contacts coupled to the source of laser light, wherein the two sets of contacts are configured to stay in abutting and sliding contact with the first and the second bus bars as the source of laser light is moved along the scale arm; and
    a switch positioned inside a switch well, wherein the switch comprises;
        a switch operator, wherein the switch operator extends vertically from the switch, and wherein a top of the switch operator is located below a top surface of the laser square.

2. The laser square of claim 1, wherein:
    the scale arm comprises the scale arm top half and a scale arm bottom half;
    the alignment arm comprises an alignment arm top half and an alignment arm bottom half;
    c. wherein the scale arm top half and the alignment arm top half are formed together as a one piece, unitary article of manufacture; and
    d. wherein the scale arm bottom half and the alignment arm bottom half are formed together as a one piece unitary article of manufacture.

3. The laser square of claim 1, wherein the pointed end is juxtaposed by the scale on the scale arm.

4. The laser square of claim 1, wherein the conductor carries electrical power to the switch.

5. A laser square comprising:
    a first scale arm defining a first linear scale, wherein the first scale arm comprises a first position indicator, and wherein the first position indicator comprises a first pointed end;
    a second scale arm at a right angle to the first scale arm, the second scale arm defining a second linear scale;
    a first source of laser light, wherein the first source of light is arranged to translate along the first scale arm in an infinitely variable manner and in a smoothly continuous manner to any position within a limit of travel along the scale arm, the first source of laser light emitting a laser light beam perpendicular to the first scale arm;
    a screw located on the first scale arm for adjusting a length of the laser light beam;
    an elongate channel formed in a bottom portion of the first scale arm, wherein the first source of laser light is located in the channel;

a shaft for mechanically coupling the first source of laser light to the first position indicator, wherein the shaft extends through an elongate opening formed in a top half of the first scale arm;

a conductor comprising:

a first bus bar; and a second bus bar running parallel to the first bus bar, wherein the first and the second bus bars along with the first source of laser light facilitate the alignment of the laser light beam at 180 degrees from the pointed end of the position indicator;

at least two sets of contacts coupled to the first source of laser light, wherein the two sets of contacts are configured to stay in abutting and sliding contact with the first and the second bus bars as the first source of laser light is moved along the first scale arm; and a switch positioned inside a switch well, wherein the switch comprises:

a switch operator, wherein the switch operator extends vertically from the switch, and wherein a top of the switch operator is located below a top surface of the laser square; and a second source of laser light arranged to translate along the second scale arm in an infinitely variable manner and in a smoothly continuous manner to any position within a limit of travel along the scale arm and further arranged to rotate.

6. The laser square of claim 5, wherein:

the first scale arm comprises the first scale arm top half and a first scale arm bottom half;

the second scale arm comprises a second scale arm top half and a second scale arm bottom half;

wherein the first scale arm top half and the second scale top half are formed together as a one piece, unitary article of manufacture; and wherein the first scale arm bottom half and the second scale arm bottom half are formed together as a one piece, unitary article of manufacture.

7. The laser square of claim 5, further comprising:

a second elongate channel in the second scale arm bottom half.

8. The laser square of claim 5, further comprising:

a second elongate opening in the second scale arm top half;

a second position indicator on top of the second scale arm top half; and e. a second shaft coupling the second source of laser light to the second position indicator through the second elongate opening.

9. The laser square of claim 8, further comprising:

a. an angular position indicator on the second position indicator, and b. a caret on the second position indicator juxtaposed by the second linear scale on the second scale arm.

10. The laser square of claim 5, further comprising a source of electrical power to power the first and second sources of laser light.

11. The laser square of claim 10, wherein the source of electrical power comprises a battery, and further comprising conductors to conduct electrical power from the battery to the first and second source of laser light.

\* \* \* \* \*